United States Patent
Hasegawa et al.

(10) Patent No.: US 6,420,010 B1
(45) Date of Patent: Jul. 16, 2002

(54) WHITE LAMINATED POLYESTER FILM FOR METALLIC PLATE LAMINATION WORK

(75) Inventors: Tetsuya Hasegawa; Hirofumi Murooka; Koji Kubo; Tetsuo Yoshida, all of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/077,837

(22) PCT Filed: Oct. 14, 1997

(86) PCT No.: PCT/JP97/03694

§ 371 (c)(1),
(2), (4) Date: Jun. 4, 1998

(87) PCT Pub. No.: WO98/17471

PCT Pub. Date: Apr. 30, 1998

(30) Foreign Application Priority Data

| | | | |
|---|---|---|---|
| Oct. 18, 1996 | (JP) | ............ | 8-275895 |
| Dec. 9, 1996 | (JP) | ............ | 8-328567 |
| Jun. 10, 1997 | (JP) | ............ | 9-152362 |
| Jun. 10, 1997 | (JP) | ............ | 9-152363 |

(51) Int. Cl.[7] ............ B32B 5/30; B32B 15/08; B32B 27/06; B32B 27/36
(52) U.S. Cl. ............ 428/141; 428/213; 428/220; 428/323; 428/331; 428/458; 428/480
(58) Field of Search ............ 428/480, 458, 428/323, 331, 141, 213, 220

(56) References Cited

U.S. PATENT DOCUMENTS

| | | | | |
|---|---|---|---|---|
| 5,618,621 A | * | 4/1997 | Hasegawa et al. | .......... 428/343 |
| 5,874,163 A | * | 2/1999 | Kosuge et al. | ............ 428/212 |
| 6,025,056 A | * | 2/2000 | Machii et al. | ............ 428/204 |

FOREIGN PATENT DOCUMENTS

| | | |
|---|---|---|
| JP | 56-10451 | 2/1981 |
| JP | 64-22530 | 1/1989 |
| JP | 1-192545 | 8/1989 |
| JP | 1-192546 | 8/1989 |
| JP | 2-57339 | 2/1990 |
| JP | 5-339391 | 12/1993 |

OTHER PUBLICATIONS

Unitane Titanium Dioxide Pigments, American Cyanamid Company, pp. 23 and 36–39, Oct. 1956.*
International Search Report, Dec. 1997.

* cited by examiner

*Primary Examiner*—Paul Thibodeau
*Assistant Examiner*—Ramsey Zacharia
(74) *Attorney, Agent, or Firm*—Sughrue Mion, PLLC

(57) ABSTRACT

The invented film comprises a layer A composed of a copolyester A, a layer B composed of a copolyester B, and a layer C composed of copolyester C. Layer A is laminated to one side of the layer B. Layer C is laminated to the other side of Layer B. Copolyester A contains 0–15 wt % of rutile titanium oxide (average particle diameter 0.1–0.5 μm). Copolyester B contains 10–50 wt % of the rutile titanium oxide. Copolyester C contains 0–15 wt % of the rutile titanium oxide. Each of Copolyester A, B, and C has a melting point of 210–245° C. The intrinsic viscosity ($\eta_A$) of the polymer part of copolyester A, the intrinsic viscosity ($\eta_B$) of the polymer part of copolyester B, and the intrinsic viscosity ($\eta_C$) of the polymer part of copolyester C satisfy the following relationship. $0.46 \leq \eta_B \leq 0.66$, $|\eta_A - \eta_B| < 0.15$, $|\eta_C - \eta_B| < 0.15$, and $|\eta_A - \eta_C| < 0.15$. The ratio of the apparent density ($\rho$) to the calculated density ($\rho_0$) of the entire laminated film satisfies the following formula, $0.75 \leq \rho / \rho_0 \leq 1.00$. The calculated density ($\rho_0$) is calculated with density of the polymer part of each copolyester, density of rutile titanium oxide, thickness of each layer, concentration of rutile titanium oxide in each copolyester, and number of copolyester layers.

12 Claims, No Drawings

WHITE LAMINATED POLYESTER FILM FOR METALLIC PLATE LAMINATION WORK

DETAILED DESCRIPTION OF THE INVENTION

1. Technical Field

This invention relates to a white laminated polyester film for metallic plate lamination work, more particularly, relates to a white laminated polyester film for metallic plate lamination work having excellent workability and hiding effect in the case of laminating to a metallic plate and forming the laminate to a metallic can having the film at the outer surface of the can and causing little abrasion of rolls for the manufacture of the film.

2. Background Arts

Metallic cans are generally coated on the inner and outer surfaces to prevent the corrosion of the metal. Coating with a thermoplastic resin film is recently attempted as a means for imparting the metallic can with rustproofness without using organic solvent for the simplification of process, improvement in hygiene, prevention of environmental pollution, etc.

Namely, the investigation is in progress to laminate a thermoplastic resin film to a metallic plate such as tinned sheet iron, tinfree steel or aluminum and manufacture a can by the drawing, etc., of the laminated plate.

Polyolefin films and polyamide films were attempted as the above thermoplastic resin film, however, these films did not satisfy the required workability, heat-resistance and aromaproofness at the same time.

Polyester films, especially polyethylene terephthalate films are attracting attention owing to the balanced characteristics, and several proposals have been made based on the film.

For example, there are the following proposals.

(1) A method to laminate a biaxially oriented polyethylene terephthalate film to a metallic plate and use the laminate as a can-manufacturing-material (Japanese Patent TOKKAISHO 56-10451 and TOKKAIHEI 1-192546), (2) A method to laminate an amorphous or an extremely low-crystalline aromatic polyester film to a metallic plate and use the laminate as a can-manufacturing material (Japanese Patent TOKKAIHEI 1-192545 and TOKKAIHEI 2-57339) and (3) A method to laminate a heat-set biaxially oriented polyethylene terephthalate film having low orientation degree to a metallic plate and use the laminate as a can-manufacturing material (Japanese Patent TOKKAISHO 64-22530).

However, these methods have failed in getting sufficiently satisfiable results and revealed the following problems.

In the method (1), the biaxially oriented polyethylene terephthalate film has excellent heat-resistance and aromaproofness, however, the workability is insufficient to generate microscopic cracks and, in extreme cases, cause the breakage of the film in the case of can-manufacturing work accompanying a large deformation.

The method (2) uses an amorphous or extremely low-crystalline aromatic polyester film having good workability but poor aromaproofness and liable to cause the embrittlement by the post-heat treatment such as printing, retort-sterilization, etc., after the manufacture of a can or by the storage over a long period to form a film easily breakable by the external shock.

The method (3) aims at the development of the effect in a region between the methods (1) and (2), however, it is not yet successful to get a film having sufficiently low orientation applicable to the manufacture of a can.

Metallic cans are generally printed on the outer surface, and the print is applied after undercoating the surface with a white coating for light-shielding. The undercoating with a white coating can be omitted by using a light-shielding white film as the thermoplastic resin film to be laminated to the metallic plate, however, the white film produced by adding white pigment to the films of the methods (1), (2) and (3) cannot solve the demerits of each method.

Further, a white film containing titanium oxide at high concentration for improving the hiding effect is brittle to deteriorate the film-forming property by the frequent film breakage in drawing and causes the problem of the abrasion of rolls used in the film-forming process.

Various methods have been proposed to improve the above-mentioned workability, aromaproofness and heat-resistance of the film.

Followings are example of these methods.

(4) A method to use a copolyester having a melting point falling within a specific range as the can-manufacturing material (Japanese Patent TOKKAIHEI 5-339391) and (5) A method to use a laminated film composed of two layers having different contents of white pigment (Japanese Patent TOKKAIHEI 6-39981).

Although the use of the method (4) or (5) is effective for improving the workability, aromaproofness and heat-resistance, the problem of the roll abrasion remains unsolved and a film having satisfactory characteristics in the film-forming process and the working of a metallic can is not yet attainable.

Problems to be Solved by the Invention

The object of the present invention is to provide a white laminated polyester film for metallic plate lamination work having excellent workability, aromaproofness and heat-resistance and causing little abrasion of rolls.

Means for Solving the Problems

According to the present invention, the above object and advantages of the present invention can be achieved first by a white laminated polyester film for metallic plate lamination work consisting of a laminated film comprising a layer (layer A) composed of a copolyester A and a layer (layer B) composed of a copolyester B, wherein (I) (i) the copolyester A contains 0 to 15% by weight of rutile titanium oxide having an average particle diameter of from 0.1 to 0.5 $\mu$m and has a melting point of from 210 to 245° C., (ii) the copolyester B contains 10 to 50% by weight of rutile titanium oxide having an average particle diameter of from 0.1 to 0.5 $\mu$m and has a melting point of from 210 to 245° C. and an intrinsic viscosity of the polymer part of from 0.46 to 0.66, (II) the intrinsic viscosity ($\eta_A$) of the polymer part of copolyester A and the intrinsic viscosity ($\eta_B$) of the polymer part of the copolyester B satisfy the following relationship:

$$|\eta_A - \eta_B| < 0.15, \text{ and}$$

(III) the ratio of the apparent density ($\rho$). to the calculated density ($\rho_0$) of the whole laminated film ($\rho/\rho_0$) satisfies the following formula:

$$0.65 \leq \rho/\rho_0 \leq 1.00$$

wherein $$\rho_0 = 100\rho_t \frac{\sum_{i=1}^{n}\left(\frac{Xi\rho_i}{W_i(\rho_i - \rho_t) + 100\rho_t}\right)}{\sum_{i=1}^{n} X_i}$$

in the above formula,
- $\rho$: apparent density (g/cm$^3$) of the whole laminated film:
- $\rho_0$: calculated density (g/cm$^3$) of the whole laminated film:
- $\rho_i$: density (g/cm$^3$) of the polymer part of each copolyester:
- $\rho_t$: density (g/cm$^3$) of rutile titanium oxide:
- $X_i$: thickness ($\mu$m) of each layer:
- $W_i$: concentration (wt. %) of rutile titanium oxide in each copolyester:
- n: number of copolyester layers.

Secondly, the object and advantages of the present invention can be achieved by a white laminated polyester film for metallic plate lamination work consisting of a laminated film (which may be abbreviated hereinafter as a second laminated film) produced by laminating a layer (layer A) composed of a copolyester A and a layer (layer C) composed of a copolyester C to both surfaces of a layer (layer B) composed of a copolyester B, provided that (i) the copolyester A contains 0 to 10% by weight of rutile titanium oxide having an average particle diameter of from 0.1 to 0.5 $\mu$m and 0.01 to 0.1% by weight of silicon dioxide particles having an average particle diameter of from 0.6 to 2.0 9 $\mu$m and has a melting point of from 210 to 245° C. and an intrinsic viscosity of the polymer part of from 0.46 to 0.66, (ii) the copolyester B contains 120 to 50% by weight of rutile titanium oxide having an average particle diameter of from 0.1 to 0.5 $\mu$m and has a melting point of from 210 to 245° C. and an intrinsic viscosity of the polymer part of from 0.46 to 0.66 and (iii) the copolyester C contains 0 to 10% by weight of rutile titanium oxide having an average particle diameter of from 0.1 to 0.54 $\mu$m and 0.01 to 0.1% by weight of silicon dioxide particles having an average particle diameter of from 0.6 to 2.0 $\mu$m and has a melting point of from 210 to 245° C. and an intrinsic viscosity of the polymer part of from 0.46 to 0.66.

The following descriptions are common to the above two kinds of laminated films unless particularly mentioned to be restricted to the second laminated film.

The copolyester A, copolyester B and copolyester C of the present invention are, for example, a polyethylene terephthalate copolymer, a polyethylene isophthalate copolymer, a polyethylene-2,6-naphthalate copolymer and a polybutylene terephtalate copolymer. Polyethylene terephthalate copolymer is preferable among the above copolymers.

The copolymerizing component of the above copolyester may be an acid component or an (+)cohol component. Examples of the acid component are aromatic dicarboxylic acids such as isophthalic acid, phthalic acid and 2,6-naphthalenedicarboxylic acid, aliphatic dicarboxylic acids such as adipic acid, azelaic acid, sebacic acid and 1,10-decanedicarboxylic acid, and alicyclic dicarboxylic acids such as 1,4-cyclohexanedicarboxylic acid, and examples of the alcohol component are aliphatic diols such as 1,4-butanediol and 1,6-hexanediol and alicyclic diols such as 1,4-cyclohexanedimethanol. These compounds may be used singly or as a combination of two or more compounds. Among the above examples, isophthalic acid or sebacic acid is preferable and, above all, isophthalic acid is especially preferable.

The kinds and ratios of the copolymerizing components of the copolyester A, copolyester B and copolyester C may be the same or different from each other.

The ratio of the copolymerizing component depends upon the kind of the component and is selected to give a polymer having a melting point of from 210 to 245° C., preferably from 215 to 235° C. A polymer having a melting point of lower than 210° C. has poor heat-resistance unable to endure the heating in the printing process after the manufacture of a can. When the melting point of the polymer exceeds 245° C., the crystallinity of the polymer is increased to deteriorate the workability to an undesirable level.

The melting point of the copolyester was measured by using DuPont Instruments 910 DSC and determining a melt peak at a heating rate of 20° C./min. The amount of specimen was about 20 mg.

The copolyester of the present invention can be produced by conventional method. For example, a polyethylene terephthalate copolymer can be produced preferably by esterifying terephthalic acid, ethylene glycol and a copolymerizing component and subjecting the obtained reaction product to polycondensation reaction to form a polyethylene terephthalate copolymer or by performing transesterification reaction of dimethyl terephthalate, ethylene glycol and a copolymerizing component and subjecting the resultant reaction product to polycondensation reaction to obtain the objective polyethylene terephthalate copolymer. The copolyester may be incorporated, as necessary, with other additives such as fluorescent brightener, antioxidant, thermal stabilizer, ultraviolet absorber and antistatic agent in the production of the copolyester. The addition of a fluorescent brightener is especially preferable in the case of improving the whiteness of the product.

The intrinsic viscosity of the polymer part of the copolyester B is from 0.46 to 0.66, preferably from 0.48 to 0.64 in the present invention. A polymer having an intrinsic viscosity of smaller than 0.46 causes frequent film breakage in the drawing of film and gives a drawn film liable to be broken in the case of forming a metallic can from a laminate of the film and a metallic plate. Intrinsic viscosity exceeding 0.66 is over-quality and lowers the productivity of the polymer material to raise the production cost.

The intrinsic viscosity ($\eta_A$) of the polymer part of the copolyester A, the intrinsic viscosity ($\eta_B$) of the polymer part of the copolyester B and the intrinsic( viscosity ($\eta_C$) of the polymer part of the copolyester C are required to satisfy the following relationships.

$$|\eta_A - \eta_B| < 0.15$$
$$|\eta_C - \eta_B| < 0.15$$
$$|\eta_A - \eta_C| < 0.15$$

All of the absolute values of the intrinsic viscosity difference of the polymer parts in each layer are preferably smaller than 0.12, more preferably smaller than 0.10.

Even if either one of the intrinsic viscosity difference of the polymer parts of these layers is 0.15 or more, a large orientation difference is caused between the layers of the laminated film to generate the curling and the laminate wrinkle and lower the lamination workability of the film to an undesirable level.

In the case of the second laminated film of the present invention containing silicon dioxide particles in the copolyester (A) and the copolyester (B), the above relationships are not necessarily fulfilled provided that all of the intrinsic viscosity of the polymer parts of the polyesters A, B and C are in the range of from 0.46 to 0.66.

The intrinsic viscosity of the polymer part of the copolyester was measured by dissolving the specimen in o-chlorophenol, removing the filler such as titanium oxide by a centrifugal separator and measuring the viscosity at 35° C.

In the present invention, the copolyesters A, B and C are incorporated with titanium Oxide to impart the film with white hiding power. It is necessary to use rutile titanium oxide having an average particle diameter of from 0.1 to 0.5 $\mu$m as the titanium oxide. The average particle diameter is preferably between 0.2 and 0.4 $\mu$m. Titanium oxide having an average particle diameter smaller than 0.1 $\mu$m is difficult to be uniformly dispersed in a copolyester and gives a film having poor white hiding power. On the other hand, rutile titanium oxide having an average particle diameter exceeding 0.5 $\mu$m is undesirable because such titanium dioxide is difficult to produce and the produced particles contain large amount of coarse particles.

The purity of the rutile titanium oxide is preferably 95% or above. Titanium oxide having a purity lower than 95% is undesirable because it has pool dispersibility in the case of adding at a high concentration and remarkably lowers the molecular weight of the copolyester.

In the present invention, the concentration of the rutile titanium oxide of the copolyester B is required to fall within the range of from 10,to 50% by weight, preferably from 20 to 50% by weight, especially from 20 to 40% by weight. The white hiding power of the film is insufficient when the concentration is lower than 10% by weight. On the other hand, the hiding power is saturated and further improvement in the hiding effect is not expectable at a concentration exceeding 50% by weight and, besides, the film becomes brittle to cause frequent breakage of the film in drawing and the produced film is liable to break in the case of forming a metallic can from a laminate of the film and a metallic plate.

The rutile titanium oxide concentration in the copolyesters A and C is 0 to 15% by weight each, preferably 0 to 10% by weight each, more preferably 0 to 6% by weight each. The roll abrasion becomes an undesirable level in the film-forming process when the concentration exceeds 15% by weight.

The rutile titanium oxide concentrations of both copolyesters A and C are preferably lower than the rutile titanium oxide concentration of the copolyester B.

For the second laminated film, the rutile titanium oxide concentration of the copolyester B is from 20 to 50% by weight and the rutile titanium oxide concentration of the copolyesters A and C is 0 to 10% by weight each.

In the present invention, the rutile titanium oxide may be used in combination with other white pigments such as alumina, calcium carbonate, silica, barium sulfate, zinc sulfide or anatase titanium oxide.

The rutile titanium oxide for the present invention is preferably subjected to the control of particle size and the removal of coarse particles by a purifying process before adding the titanium oxide to the copolyester. An example of the industrial means for the purification is dry or wet centrifugal separation. It is especially preferable to use two or more of the above purifying means in combination and purify the titanium oxide in stepwise.

The addition of the rutile titanium oxide to the copolyester can be performed by various means. Representative means are as follows.

(a) addition of titanium oxide after the transesterification reaction or esterification reaction or before the start of polycondensation reaction in the synthesis of the copolyester, (b) addition of titanium oxide to the copolyester and kneading of the mixture in molten state, (c) production of master pellets containing a large amount of rutile titanium oxide by the method (a) or (b) and kneading of the master pellet with a copolyester free from rutile titanium oxide to obtain a copolyester containing a desired amount of rutile titanium oxide.

In the case of using the method (a) comprising the addition of rutile titanium oxide in the synthesis of polyester, it is preferable to add the rutile titanium oxide to a reaction system in the form of a slurry dispersed in glycol.

The second laminated film of the present invention contains silicon dioxide particles in the copolyesters A and C.

The average particle diameter of the silicon dioxide particles is preferably between 0.6 and 2.0 $\mu$m, more preferably between 0.8 and 1.7 $\mu$m and especially preferably between 1.2 and 1.7 $\mu$m. The content of the silicon dioxide particles is preferably between 0.01 and 0.1% by weight, more preferably between 0.03 and 0.08% by weight. The copolyesters A and C preferably contain the same amount of silicon dioxide particles. The slipperiness of the film and the form of wound roll become poor and the scratch resistance, chipping resistance and transportability of the film are lowered when the average particle diameter is smaller than 0.6 $\mu$m or the content of the particle is less than 0.01% by weight, and troubles such as falling off of particles may occur in the manufacturing process when the average particle diameter is larger than 2.0 $\mu$m or the content of the particle is more than 0.1% by Weight. The silicon dioxide particle may have various forms such as block, coagulate or true sphere and the use of silicon dioxide particles having truly spherical form is preferable from the viewpoints of small amount of coarse particle and the resistance to falling off The truly spherical form means particles having a ratio of the major diameter to the minor diameter of smaller than 1.2.

The addition of silicon dioxide particles to a copolyester is preferably carried out by the method used in the addition of rutile titanium oxide.

The average particle diameter was determined by metallizing the surface of the particles, photographing the particles by an electron microscope with magnification of 10,000 to 30,000, measuring the major diameters, minor diameters and diameters of equivalent area circle, and using the average value of the equivalent area circle diameter as the average particle diameter.

The surface of the second laminated film of the present invention preferably has the following characteristics. The surface roughness (Ra) is between 0.103 and 0.08 $\mu$m, the 10-point surface roughness (SRz) is between 0.7 and 1.5 $\mu$m and the frictional coefficient is smaller than 0.35.

A laminated film having surface characteristics satisfying the above three characteristic requirements has good film transportability, scratch resistance, chipping resistance and windability in the film-forming process and workability of a metallic can.

A film satisfying the above three characteristic requirements can be produced by compounding copolyesters A and C with silicon dioxide particles having the above-mentioned average particle diameter at the above-mentioned ratio.

The surface roughness (Ra) is a value defined by JIS B0601. In the present invention, it was measured by a tracer-type surface roughness tester manufactured by Kosaka Kenkyusho Co. (SE-3FAT) using a feeler having a tip radius of 2 μm at a feeler pressure of 30 mg, a cut-off of 0.25 mm and a measuring length of 2.5 mm. The 10-point average roughness (SRz) was measured by measuring the three-dimensional roughness profile of the film surface by a three-dimensional roughness tester manufactured by Kosaka Kenkyusho Co. (SE-3CK) using a feeler having a tip radius of 2 μm at a feeler pressure of 30 mg, a measuring length of 1.3 mm, a sampling pitch of 2 μm, a cut-off of 0.25 mm, a vertical magnification of 20,000, a horizontal magnification of 200 and a scanning line number of 100, and using the distance between the mean height of the highest 5 peaks and the mean depth of the deepest 5 valleys in the measured profile as the 10-point average roughness (SRz). The friction coefficient was measured in conformity to ASTM D1894 and the value of kinetic friction coefficient (μk) was used as the friction coefficient.

The ratio ($\rho/\rho_0$) of the apparent density ($\rho$) to the calculated density ($\rho_0$) of the film of the present invention is required to fall between 0.65 and 1.00. The ratio ($\rho/\rho_0$) is preferably between 0.75 and 1.00, especially preferably, between 0.90 and 1.00.

The density ratio of the second laminated film is not necessarily but preferably satisfy the above requirement.

The calculated density ($\rho_0$) is defined by the following formula.

$$\rho_0 = 100\rho_t \frac{\sum_{i=1}^{n} \left( \frac{X_i \rho_i}{W_i(\rho_i - \rho_t) + 100\rho_t} \right)}{\sum_{i=1}^{n} X_i}$$

For the second laminated film containing silicon dioxide particles, the calculated density ($\rho_0$) is calculated by the following formula.

$$\rho_0 = 100\rho_t\rho_s \frac{\sum_{i=1}^{n} \left( \frac{X_i \rho_i}{W_i\rho_s(\rho_i - \rho_t) + Z_i\rho_t(\rho_i - \rho_s) + 100\rho_t\rho_s} \right)}{\sum_{i=1}^{n} X_i}$$

in the above formulas,
- $\rho_0$: calculated density (g/cm³) of the whole laminated film:
- $\rho_i$: density (g/cm³) of the polymer part of each copolyester:
- $\rho_t$: density (g/cm³) of rutile titanium oxide:
- $\rho_s$: density (g/cm³) of silicon dioxide particle:
- $X_i$: thickness (μm) of each layer:
- $W_i$: concentration (wt. %) of rutile titanium oxide in each copolyester:
- $Z_i$: concentration (wt. %) of silicon dioxide particles in each copolyester:
- n: number of copolyester layers.

The film-forming property of the polymer and the workability of metallic can can be improved by setting the ratio of apparent density to calculated density ($\rho/\rho_0$) within the above range.

When the ratio of the apparent density to calculated density ($\rho/\rho_0$) is smaller than 0.65, voids are generated in the produced film to cause the embrittlement of the film and, accordingly, the frequency of the breakage of film in drawing is increased to lower the productivity (film-forming property). The produced film is liable to cause the breakage, cracking or small defects in the case of forming a metallic can from the laminate of the film and a metallic can. The apparent density of the film is measured by using a density gradient tube.

The (100) plane and the (1$\bar{1}$0) plane parallel to the film surface of the film of the present invention preferably satisfy the following relationship:

$$0.15 \leq f(1\bar{1}0)/f(100) \leq 0.40$$

wherein $f(1\bar{1}0)$ is X-ray diffraction intensity attributed to the (1$\bar{1}$0) plane and $f(100)$ is X-ray diffraction intensity attributed to the (100) plane.

The intensity ratio ($f(1\bar{1}0)/f(100)$) is preferably between 0.22 and 0.40.

When the intensity ratio is smaller than 0.15, a number of voids are generated by the high orientation of the film to cause easy breakage in film-forming and deterioration of workability of the film. Conversely, uneven thickness is liable to occur in the film-forming when the intensity ratio exceeds 0.4.

The X-ray diffraction intensity was measured by the following method. The intensity of X-ray diffraction by the (100) plane parallel to the film surface and the intensity of X-ray diffraction by the (1$\bar{1}$0) plane were measured by using CuK-α as the X-ray source under the conditions of a divergence slit of ½°, a scattering slit of ⅟₂₀°, a reception slit of 0.15 mm and a scan speed of 1.000°/min by the multiple peak separation method using Pseudo Voight peak model and the intensity ratio was calculated from both intensity values.

The X-ray diffraction intensity was defined by the area of the diffraction peak of each crystal plane. Reflection peaks (anatase (101) and rutile (110)) caused by the pigment such as titanium oxide are present near that of the (100) plane, and the area is calculated omitting the area of these peaks.

The film of the present invention has an MOR value of preferably not smaller than 1.0 and not larger than 1.5, more preferably not smaller than 1.0 and smaller than 1.4, especially not smaller than 1.0 and smaller than 1.3.

When the MOR value exceeds 1.5, the anisotropy in the plane of the laminated film becomes large and microcracks and breakage may occur in the manufacture of a metallic can from a laminate of the film and a metallic plate.

The MOR value is a parameter representing the molecular orientation of a film and calculated by the ratio of the maximum value ($X_{MAX}$) and the minimum value ($X_{MIN}$) ($X_{MAX}/X_{MIN}$) of the transmission intensity of microwave transmitted through the film. The MOR value closer to 1 corresponds to the better balance of the orientation of the film in all directions. The MOR value close to 1 is preferable for the laminated film of the present invention.

The transmission intensity of microwave was measured by a molecular orientation tester MOA-2001A manufactured by Kanzaki Paper Co.

The following explanation is, an example of the manufacture of a white laminated polyester film of the present invention by biaxial drawing, especially sequential biaxial drawing.

The explained drawing method does not restrict the scope of the present invention.

Copolyesters constituting the individual layers of the white laminated polyester film of the present invention are separately melted, co-extruded through. a die, brought into contact before solidification and immediately quenched to obtain an essentially amorphous copolyester sheet. The sheet is drawn in longitudinal direction by heating with rolls, infrared rays, etc. The longitudinal drawing is preferably carried out at a drawing temperature higher than the glass transition point (Tg) of the copolyester by 20 to 50° C. at a draw ratio of 2.5 to 3.6 especially in two or more divided steps. The drawing in lateral direction is preferably carried out by starting at a temperature higher than the Tg of the copolyester by 20° C. or more and raising the temperature up to a level lower than the melting point (Tm) of the polyester by 100 to 130° C. at a lateral draw ratio of 2.6 to 3.7. The heat-set temperature is preferably selected between 150° C. and 230° C. taking consideration of the melting point of the copolyester polymer to get a desired film quality. The laminated film is also producible e.g. by separately melting and extruding the copolyesters to form separate films and laminating and welding the films in undrawn state or after drawing by the above drawing methods.

The white laminated polyester film of the present invention preferably has a thickness of from 6 to 75 μm, more preferably from 10 to 75 μm, especially from 15 to 50μm. A film thinner than 6 μm is liable to cause the cracking, etc., in the manufacture of a metallic can and a film having a thickness exceeding 75 μm has an unnecessarily excess quality resulting in high cost.

The white laminated polyester film of the present invention has a double-layered or triple-layered structure consisting of a layer B as the core layer, a layer A laminated to one surface of the layer B and optionally a layer C laminated to the other surface of the layer B. A triple-layered laminated film is preferable from the object of the present invention.

The ratio of the thickness ($T_A$) of the layer A to the thickness ($T_B$) of the layer B ($T_A/T_B$) and the ratio of the thickness ($T_C$) of the layer C to the thickness ($T_B$) of the layer B ($T_C/T_B$) are preferably between 0.05 and 1 each, more preferably between 0.1 and 0.7 each.

The white laminated polyester film of the present invention preferably shows an electric current of 0.2 mA or less in the ERV test of a metallic can manufactured by the deep drawing of a laminate of the above film and a metallic plate.

The electric current exceeding 0.2 mA in the ERV test corresponds to the generation of micro-cracks such as pinholes in the film by the deep drawing revealing the poor workability of the film.

The ERV test is carried out by filling a manufactured can with 1% aqueous solution of NaCl, inserting an electrode into the solution and measuring the electric current under the application of electric voltage of 6V between the electrode and the can used as the anode.

The metallic plate to be laminated with the white laminated polyester film of the present invention is preferably a plate of tinplate, tin-free steel, aluminum, etc., especially as a metal plate for canning. The lamination of the film to the metallic plate can be carried out e.g. by the following methods (1) and (2).

(1) A film is laminated to a metallic plate heated at or above the melting point of the film and the laminate is cooled to bond the film to the metallic plate through an amorphous layer formed at the surface layer (thin layer) of the film contacting with the metallic plate.

(2) An adhesive layer is applied to the film as a primer and a metallic plate is bonded to the primer-coated surface of the film. A conventional resin adhesive such as epoxy adhesive, epoxy-ester adhesive or alkyd adhesive can be used as the adhesive layer.

The white laminated polyester film for metallic plate lamination work of the present invention is most suitable for the use to be laminated to a metallic plate to form the outer surface of a metallic can in the case of manufacturing a metallic can by deep-drawing and optionally ironing of a metallic plate.

EXAMPLES

The present invention is described in more detail by the following examples. The characteristic values in the examples were measured and evaluated by the following methods.

(1) Melting Point of Copolyester

The melting point of the copolyester was determined by measuring the melt peak with Du Pont Instruments 910 DSC at a temperature increasing rate of 20° C. /min. The amount of the specimen was about 20 mg.

(2) Intrinsic Viscosity of Copolyester

The intrinsic viscosity was measured by dissolving a specimen film in o-chlorophenol, removing fillers such as titanium oxide by a centrifugal separator and measuring at 35° C.

The intrinsic viscosity of each layer is the value of an undrawn film manufactured by singly extruding the copolyester of each layer.

(3) Average Particle Diameter of Particles

Particles were surface-metallized and the major diameter, the minor diameter and the diameter of equivalent area circle were measured from an image magnified 10,000 to 30,000 times by an electron microscope. The average of the diameters of equivalent area circle was used as the average particle diameter.

(4) X-ray Diffraction Intensity Ratio

The intensity of X-ray diffraction (f(100)) by the (100) plane parallel to the film surface and the intensity of X-ray diffraction (f(1$\bar{1}$0)) by the (1$\bar{1}$0) plane were measured by using CuK-α as the X-ray source under the conditions of a divergence slit of ½°, a scattering slit of ½°, a reception slit of 0.15 mm and a scan speed of 1.000°/min by the multiple peak separation method using Pseudo Voight peak model.

The intensity ratio was calculated from the following formula.

$$\text{X-ray diffraction intensity ratio} = f(1\bar{1}0)/f(100)$$

The area of diffraction peak attributed to each crystal plane was measured and the area was used as the X-ray diffraction intensity. Reflection peaks caused by the pigment such as titanium oxide (anatase (101), rutile (110)) are present close to the (100) plane peak and these peaks caused by the pigment are omitted. in the calculation of the area.

(5) Density Ratio (ρ/ρ₀)

The apparent density (ρ) of the film was measured by using a density gradient tube. The density ratio was determined by dividing the apparent density by the calculated density (ρ₀) calculated by the following formula.

$$\rho_0 = 100\rho_t\rho_s \frac{\sum_{i=1}^{n}\left(\frac{X_i\rho_i}{W_i\rho_s(\rho_i-\rho_t)+Z_i\rho_t(\rho_i-\rho_s)+100\rho_t\rho_s}\right)}{\sum_{i=1}^{n}X_i}$$

in the above formula, $\rho_0$: calculated density (g/cm³) of the whole laminated film:

$\rho_i$: density (g/cm³) of the polymer part of each copolyester:

$\rho_t$: density (g/cm³) of rutile titanium oxide:

$\rho_s$: density (g/cm³) of silicon dioxide particle (1 in the case free from silicon dioxide particle):

$X_i$: thickness (μm) of each layer:

$W_i$: concentration (wt. %) of rutile titanium oxide in each copolyester:

$Z_i$: concentration (wt. %) of silicon dioxide particle in each copolyester:

n number of copolyester layers.

(6) MOR Value

The MOR value was determined by a molecular orientation tester MOA-2001A manufactured by Kanzaki Paper Co. by measuring the maximum value ($X_{MAX}$) and the minimum value ($X_{MIN}$) of the transmission intensity of microwave and calculating by the following formula:

MOR value=$X_{MAX}/X_{MIN}$ (7) Center-line Average Height (Ra)

The center-line average height (Ra) is a value defined by JIS B0601.

In the present invention, it was measured by a tracer-type surface roughness tester manufactured by Kosaka Kenkyusho Co. (SE-3FAT) using a feeler having a tip radius of 2 μm at a feeler pressure of 30 mg, a cut-off of 0.25 mm and a measuring length of 2.5 mm.

(8) Ten-point Average Roughness (SRz)

The 10-point average roughness (SRz) was measured by measuring the three-dimensional roughness profile of the film surface by a three-dimensional roughness tester manufactured by Kosaka Kenkyusho Co. (SE-3CK) using a feeler having a tip radius of 2 μm at a feeler pressure of 30 mg, a measuring length of 1.3 mm, a sampling pitch of 2 μm, a cut-off of 0.25 mm, a vertical magnification of 20,000, a horizontal magnification of 200 and a scanning line number of 100, and using the distance between the mean heights of the highest 5 peaks and the mean depth of the deepest 5 valleys in the measured profile as the 10-point average roughness (SRz).

(9) Friction Coefficient

The friction coefficient was measured in conformity to ASTM D1894 and the value of kinetic friction coefficient (μk) was used as the friction coefficient.

(10) Film-forming Property

The film-forming property in the manufacture of a film was evaluated by the following criterion.

◯: There is little breakage of the film to enable stable film-forming.

X: Breakage of film frequently takes place to exhibit poor film-forming performance.

(11) Windability

The windability of a film was evaluated by winding 10,000 m of a film of 1,000 mm wide at a speed of 500 m/min in the form of a roll and observing the protruding extent of the film from a roll end.

◎: Protrusion of the film is 3 mm or less and the roll has good appearance.

◯: Protrusion of the film is 5 mm or less.

X: Protrusion of the film exceeds 5 mm.

(12) Abrasion Resistance

A film specimen was cut to ½inch wide at 20° C. and 60% RH, an edge of a blade (blade for industrial razor tester manufactured by GKI Ltd., UK) was applied perpendicularly to the film, pressed into the film to a depth of 1.5 mm and moved at a speed of 60 m/min and an inlet tension of 60 g. The abrasion (W) of the blade was measured by SEM after moving the film over a length of 50 m, and the abrasion resistance was evaluated by the following criterion.

◯: W<4.0×10⁴ μcm³

X: W≧4.0×10⁴ μm³

(13) Lamination suitability

A film was laminated to both surfaces of a tin-free steel plate of 0.25 mm thick heated at 260° C., the laminate was cooled with water, a circular disk of 150 mm diameter was cut off from the laminate and the disk was subjected to deep-drawing with a drawing die and a punch in 3 stages to form a can free from seam at the side face and having a diameter of 55 mm (which may be hereinafter abbreviated as "can"). The worked state was evaluated by the following criterion.

◯: Free from wrinkle showing good lamination suitability

X: Wrinkles are generated in the lamination.

(14) Deep-drawing Suitability-1

The behavior of the film in deep-drawing and the manufactured can were observed and evaluated by the following criterion.

◯: There is no abnormality in the films on the inner and the outer surfaces of the manufactured can and no microcrack and breakage was unobservable on the films.

X: Breakage of film was observable at a part of the films on the inner and the outer surfaces of the manufactured can.

(15) Deep-drawing Suitability-2

The behavior of the film in deep-drawing and the manufactured can were observed and evaluated by the following criterion.

◯: There is no abnormality in the films on the inner and the outer surfaces of the manufactured can and the rust-proofing test (the can was filled with 1% NaCl solution, an electrode was inserted into the can and electric current was measured under a voltage of 6V using the can as the anode. The test may be abbreviated hereunder as ERV test) was 0.2 mA or less.

X: No abnormality was unobservable on both inner and outer face films, however, the electric current was larger than 0.2 mA in the EVR test, and pinhole-like crack was observable on the film starting from a coarse lubricant particle by magnifying the electrified part of the film.

(16) Impact Crack Resistance

A can having good deep-drawing suitability was filled with water and 10 cans for each test were dropped on a PVC tile floor from a height of 30 cm. EVR test was performed on the film of the inner face of the can and the impact crack resistance was evaluated by the following criterion.

◯: The current was 0.2 mA or less for all 10 cans.

Δ: The current was over 0.2 mA for one to five of the cans.

X: The current was over 0.2 mA for six or more cans or crack of the film was observable after the drop test.

(17) Thermal Embrittlement Resistance

A can having good deep-drawing suitability was maintained at 210° C. for 5 minutes and the aforementioned impact crack resistance test was carried out. The result was evaluated by the following criterion.

◯: The current was 0.2 mA or less for all 10 cans.

Δ: The current was over 0.2 mA for one to five of the cans.

X: The current was over 0.2 mA for six or more cans or crack of the film was observable after heating at 210° C. for 5 minutes.

(18) Whiteness of the Outer Surface of the Can

Black lines of 50 mm long and 0.2 mm and 1.4 mm wide were drawn by a drawing pen on the tin-free steel surface forming the outer surface of a can before laminating a film to a tin-free steel. A can was manufactured from a laminate of the tin-free steel and a specimen film and the black lines were observed through the film. The result was evaluated by the following criterion.

○: Both black lines were invisible.

Δ: One black line was faintly observable and the other one was invisible.

X: One black line was observable and the other one was faintly observable.

Examples 1 to 7 and Comparative Examples 1 to 6

Polyesters for the layer A, layer B and layer C were produced by adding rutile titanium oxides having average particle diameters shown in the Table 1 at concentrations shown in the Table 1 to copolymerized polyethylene terephthalate copolymerized with the components shown in the Table 1. These polyesters were separately melted and then co-extruded through adjacent dies under the film-forming conditions shown in the Table 3 to effect the lamination and welding of the layers. The laminate was solidified by quenching, and the obtained undrawn film was longitudinally drawn in longitudinal direction and then lateral direction and heat-set under conditions shown in the Table 3 to obtain a biaxially oriented white laminated film having a thickness of 20 μm. The properties of the film are shown in the Table 4.

Comparative Example 7 and 8

Polyesters for the layer A, layer B and layer C were produced by adding rutile titanium oxides having average particle diameters shown in the Table 2 at concentrations shown in the Table 2 to a polyethylene terephthalate copolymerized with 12 mol % of isophthalic acid. These polyesters were melted and extruded under the film-forming conditions shown in the Table 3 and solidified by quenching to obtain undrawn films. These undrawn films were drawn in longitudinal direction and lateral direction and subsequently heat-set to obtain biaxially oriented films of 20 μm thick. The properties of the films are shown in the Table 4.

TABLE 1

| | Layer A | | | | | Layer B | | | | |
|---|---|---|---|---|---|---|---|---|---|---|
| | Copolymerized Component | | Meltg Point | Thickness | Aver. Diam. | $TiO_2$ Conc. | Copolymerized Component | | Meltg Point | Thickness | Aver. Diam. | $TiO_2$ Conc. |
| | Comp. | Mol % | °C. | μm | μm | Wt. % | Comp | Mol % | °C. | μm | μm | Wt. % |
| Example 1 | IA | 12 | 228 | 3 | 0.24 | 1 | IA | 12 | 228 | 14 | 0.24 | 10 |
| Example 2 | IA | 12 | 228 | 3 | 0.24 | 10 | IA | 12 | 228 | 14 | 0.27 | 15 |
| Example 3 | IA | 6 | 244 | 3 | 0.24 | 2 | IA | 6 | 244 | 14 | 0.24 | 20 |
| Example 4 | SA | 12 | 228 | 3 | — | 0 | SA | 12 | 228 | 14 | 0.24 | 25 |
| Example 5 | SA | 14 | 223 | 1.5 | 0.20 | 5 | SA | 12 | 228 | 17 | 0.30 | 30 |
| Example 6 | IA | 14 | 223 | 4 | 0.20 | 1 | IA | 14 | 223 | 12 | 0.30 | 40 |
| Example 7 | IA | 12 | 228 | 3 | 0.24 | 1 | IA | 12 | 228 | 12 | 0.24 | 25 |
| Comp-tive Example 1 | — | | 260 | 3 | 0.24 | 5 | — | | 260 | 14 | 0.24 | 20 |
| Comp-tive Example 2 | IA | 4 | 250 | 3 | 0.24 | 3 | IA | 4 | 250 | 14 | 0.24 | 20 |
| Comp-tive Example 3 | IA | 22 | 208 | 3 | 0.24 | 8 | IA | 22 | 208 | 14 | 0.24 | 25 |
| Comp-tive Example 4 | SA | 12 | 228 | 1.5 | 0.24 | 20 | IA | 12 | 228 | 17 | 0.24 | 20 |
| Comp-tive Example 5 | IA | 12 | 228 | 3 | 0.24 | 1 | IA | 12 | 228 | 14 | 0.27 | 5 |
| Comp-tive Example 6 | IA | 12 | 228 | 3 | 0.24 | 1 | IA | 12 | 228 | 12 | 0.24 | 35 |

| | Layer C | | | | | |
|---|---|---|---|---|---|---|
| | Copolymerized Component | | Meltg Point | Thickness | Aver. Diam. | $TiO_2$ Conc. |
| | Comp | Mol % | °C. | μm | μm | Wt. % |
| Example 1 | IA | 12 | 228 | 3 | 0.24 | 1 |
| Example 2 | IA | 12 | 228 | 3 | 0.24 | 10 |
| Example 3 | IA | 6 | 244 | 3 | 0.24 | 2 |
| Example 4 | SA | 12 | 228 | 3 | — | 0 |
| Example 5 | SA | 14 | 223 | 1.5 | 0.20 | 5 |
| Example 6 | IA | 14 | 223 | 4 | 0.20 | 1 |
| Example 7 | SA | 14 | 223 | 5 | 0.24 | 8 |
| Comp-tive Example 1 | — | | 260 | 3 | 0.24 | 5 |
| Comp-tive Example 2 | IA | 4 | 250 | 3 | 0.24 | 3 |
| Comp-tive Example 3 | IA | 22 | 208 | 3 | 0.24 | 8 |
| Comp-tive Example 4 | SA | 12 | 228 | 1.5 | 0.24 | 20 |
| Comp-tive Example 5 | IA | 12 | 228 | 3 | 0.24 | 1 |

TABLE 1-continued

| | | | | | | |
|---|---|---|---|---|---|---|
| Comp-tive Example 6 | IA | 12 | 228 | 5 | 0.24 | 20 |

Note: IA: Isophthalic acid, SA: Sebacic acid

TABLE 2

| | Layer A | | | | Layer B | | | | Layer C | | | |
|---|---|---|---|---|---|---|---|---|---|---|---|---|
| | Thickness μm | White pigment | Average diameter μm | Conc. of pigment wt. % | Thickness μm | White pigment | Average diameter μm | Conc. of pigment wt. % | Thickness μm | White pigment | Average diameter μm | Conc. of pigment wt. % |
| Comparative Example 7 | 3 | Rutile TiO2 | 0.24 | 1 | 14 | Calcium carbonate | 2.70 | 10 | 3 | Rutile TiO2 | 0.24 | 1 |
| Comparative Example 8 | 3 | Rutile TiO2 | 0.24 | 1 | 14 | Barium sulfate | 0.8 | 10 | 3 | Rutile TiO2 | 0.24 | 1 |

TABLE 3

| | Melt-extrusion temperature °C. | | | Longit-nal drawing conditions | | Lateral drawing conditions | | Heat-set |
|---|---|---|---|---|---|---|---|---|
| | Layer A | Layer B | Layer C | Temp. °C. | Draw ratio | Temp. °C. | Draw ratio | temp. °C. |
| Example 1 | 290 | 290 | 290 | 115 | 2.9 | 130 | 3.0 | 180 |
| Example 2 | 280 | 280 | 280 | 110 | 3.2 | 120 | 3.3 | 190 |
| Example 3 | 280 | 290 | 280 | 115 | 3.1 | 130 | 3.1 | 175 |
| Example 4 | 285 | 285 | 285 | 110 | 3.4 | 120 | 3.4 | 185 |
| Example 5 | 275 | 280 | 275 | 115 | 3.0 | 120 | 3.1 | 175 |
| Example 6 | 275 | 280 | 275 | 95 | 2.8 | 110 | 3.0 | 165 |
| Example 7 | 275 | 280 | 275 | 100 | 2.8 | 115 | 3.0 | 175 |
| Comparative Example 1 | 290 | 290 | 290 | 120 | 3.4 | 130 | 3.4 | 230 |
| Comparative Example 2 | 290 | 290 | 290 | 110 | 3.0 | 120 | 3.1 | 180 |
| Comparative Example 3 | 275 | 275 | 275 | 90 | 2.9 | 100 | 3.0 | 165 |
| Comparative Example 4 | 280 | 280 | 280 | 110 | 3.0 | 120 | 3.1 | 185 |
| Comparative Example 5 | 280 | 280 | 280 | 110 | 3.0 | 120 | 3.1 | 195 |
| Comparative Example 6 | 275 | 280 | 275 | 100 | 2.8 | 115 | 3.0 | 175 |
| Comparative Example 7 | 280 | 280 | 280 | 110 | 3.0 | 120 | 3.1 | 185 |
| Comperative Example 8 | 280 | 280 | 280 | 110 | 3.0 | 120 | 3.1 | 185 |

TABLE 4

| | | Intrinsic viscosity | | | Lamination suitability | Abrasion Resistance | | Deep-drawing suitability | | Impact crack resistance | Heat embrittlement resistance | Whiteness of outer face of can |
|---|---|---|---|---|---|---|---|---|---|---|---|---|
| | ρ/ρo | Layer A | Layer B | Layer C | | Layer A | Layer C | 1 | 2 | | | |
| Example 1 | 0.99 | 0.60 | 0.58 | 0.60 | ○ | ○ | ○ | ○ | ○ | ○ | ○ | ○ |
| Example 2 | 0.98 | 0.56 | 0.55 | 0.56 | ○ | ○ | ○ | ○ | ○ | ○ | ○ | ○ |
| Example 3 | 0.96 | 0.60 | 0.54 | 0.60 | ○ | ○ | ○ | ○ | ○ | ○ | ○ | ○ |
| Example 4 | 0.95 | 0.60 | 0.51 | 0.60 | ○ | ○ | ○ | ○ | ○ | ○ | ○ | ○ |
| Example 5 | 0.87 | 0.58 | 0.49 | 0.58 | ○ | ○ | ○ | ○ | ○ | ○ | ○ | ○ |
| Example 6 | 0.68 | 0.60 | 0.48 | 0.60 | ○ | ○ | ○ | ○ | ○ | ○ | ○ | ○ |
| Example 7 | 0.95 | 0.60 | 0.52 | 0.55 | ○ | ○ | ○ | ○ | ○ | ○ | ○ | ○ |
| Comparative Example 1 | 0.99 | 0.58 | 0.53 | 0.58 | ○ | ○ | ○ | X | — | — | — | ○ |
| Comparative Example 2 | 0.94 | 0.59 | 0.53 | 0.59 | ○ | ○ | ○ | ○ | ○ | Δ | X | ○ |
| Comparative Example 3 | 0.94 | 0.55 | 0.51 | 0.55 | ○ | ○ | ○ | ○ | ○ | ○ | X | ○ |
| Comparative Example 4 | 0.98 | 0.54 | 0.54 | 0.54 | ○ | X | X | ○ | ○ | ○ | ○ | ○ |
| Comparative Example 5 | 1.00 | 0.62 | 0.58 | 0.62 | ○ | ○ | ○ | ○ | ○ | ○ | ○ | X |

TABLE 4-continued

| | Intrinsic viscosity | | | Lamination suitability | Abrasion Resistance | | Deep-drawing suitability | | Impact crack resistance | Heat embrittlement resistance | Whiteness of outer face of can |
|---|---|---|---|---|---|---|---|---|---|---|---|
| | ρ/ρo | Layer A | Layer B | Layer C | | Layer A | Layer C | 1 | 2 | | | |
| Comparative Example 6 | 0.77 | 0.65 | 0.50 | 0.50 | X | ○ | X | ○ | X | — | — | ○ |
| Comparative Example 7 | 0.83 | 0.61 | 0.52 | 0.61 | ○ | ○ | ○ | ○ | X | — | — | X |
| Comparative Example 8 | 0.85 | 0.63 | 0.52 | 0.63 | ○ | ○ | ○ | ○ | ○ | ○ | ○ | X |

Examples 8 to 14 and Comparative Examples 9 to 15

Copolyesters for the layer A, layer B and layer C were produced by adding rutile titanium oxides having average particle diameters shown in the Table 5 at concentrations shown in the Table 5 to copolymerized polyethylene terephthalates copolymerized with the components shown in the Table 5. These copolyesters were separately melted and then coextruded through adjacent dies under the film-forming conditions shown in the Table 7 to effect the lamination and welding of the layers. The laminate was solidified by quenching, and the obtained undrawn film was drawn in longitudinal direction and then lateral direction and heat-set under conditions shown in the Table 7 to obtain a biaxially oriented film having a thickness of 20 μm. The drawing in longitudinal direction was carried out in two stages at a draw ratio of 1.7 each for the Examples 8, 10, 11 and 14. The properties of these films are shown in the Table 8.

The intrinsic viscosity of each layer in the Table 8 are the viscosity of undrawn film produced by singly extruding the copolyester for each layer.

Comparative Examples 16 and 17

A polyethylene terephthalate copolymerized with 12 mol % of isophthalic acid was incorporated with rutile titanium oxide, calcium carbonate and barium sulfate having average particle diameters shown in the Table 6 in amounts shown in the Table 6, melted and extruded under the form-forming condition shown in the Table 7 and solidified by quenching to obtain an undrawn film. The undrawn film was drawn in longitudinal direction and then lateral direction and subsequently heat-set to obtain a biaxially oriented film having a thickness of 20 μm. The properties of these films are shown in the Table 8.

TABLE 5

| | Layer A | | | | | Layer B | | | | |
|---|---|---|---|---|---|---|---|---|---|---|
| | Copolymerized Component | | Meltg Point | Thickness | Aver. Diam. | TiO$_2$ Conc. | Copolymerized Component | | Meltg Point | Thickness | Aver. Diam. | TiO$_2$ Conc. |
| | Comp. | Mol % | °C. | μm | μm | Wt. % | Comp | Mol % | °C. | μm | μm | Wt. % |
| Example 8 | IA | 12 | 228 | 1.5 | 0.22 | 3 | IA | 12 | 228 | 17 | 0.22 | 30 |
| Example 9 | IA | 12 | 228 | 3 | 0.22 | 10 | IA | 12 | 228 | 14 | 0.27 | 11 |
| Example 10 | IA | 12 | 228 | 1.5 | 0.24 | 2 | IA | 12 | 228 | 17 | 0.24 | 40 |
| Example 11 | SA | 14 | 223 | 4 | — | 0 | SA | 14 | 223 | 12 | 0.24 | 45 |
| Example 12 | SA | 6 | 244 | 1.5 | 0.20 | 5 | SA | 6 | 244 | 17 | 0.30 | 20 |
| Example 13 | IA | 14 | 223 | 4 | 0.20 | 1 | IA | 14 | 223 | 12 | 0.30 | 40 |
| Example 14 | IA | 14 | 223 | 3 | 0.24 | 2 | IA | 12 | 228 | 12 | 0.24 | 25 |
| Comp-tive Example 9 | — | | 260 | 3 | 0.24 | 4 | IA | 2 | 255 | 14 | 0.24 | 18 |
| Comp-tive Example 10 | IA | 4 | 250 | 3 | 0.24 | 4 | IA | 4 | 250 | 14 | 0.24 | 18 |
| Comp-tive Example 11 | IA | 22 | 208 | 3 | 0.24 | 5 | IA | 23 | 206 | 14 | 0.24 | 25 |
| Comp-tive Example 12 | SA | 10 | 233 | 1.5 | 0.24 | 20 | IA | 12 | 228 | 17 | 0.24 | 21 |
| Comp-tive Example 13 | IA | 12 | 228 | 3 | 0.24 | 1 | IA | 12 | 228 | 14 | 0.27 | 6 |
| Comp-tive Example 14 | IA | 12 | 228 | 3 | 0.24 | 1 | IA | 12 | 228 | 12 | 0.24 | 35 |
| Comp-tive Example 15 | SA | 14 | 223 | 4 | — | 0 | SA | 14 | 223 | 12 | 0.24 | 45 |

| | Layer C | | | | | |
|---|---|---|---|---|---|---|
| | Copolymerized Component | | Meltg Point | Thickness | Aver. Diam. | TiO$_2$ Conc. |
| | Comp | Mol % | °C. | μm | μm | Wt. % |
| Example 8 | IA | 12 | 228 | 1.5 | 0.22 | 3 |
| Example 9 | IA | 12 | 228 | 3 | 0.22 | 10 |

TABLE 5-continued

|  |  |  |  |  |  |  |
|---|---|---|---|---|---|---|
| Example 10 | IA | 12 | 228 | 3 | 0.24 | 2 |
| Example 11 | SA | 14 | 223 | 4 | — | 0 |
| Example 12 | SA | 6 | 244 | 1.5 | 0.20 | 5 |
| Example 13 | IA | 14 | 223 | 4 | 0.20 | 1 |
| Example 14 | SA | 10 | 233 | 5 | 0.24 | 7 |
| Comp-tive Example 9 | — |  | 260 | 3 | 0.24 | 4 |
| Comp-tive Example 10 | IA | 4 | 250 | 3 | 0.24 | 4 |
| Comp-tive Example 11 | IA | 22 | 208 | 3 | 0.24 | 5 |
| Comp-tive Example 12 | SA | 10 | 233 | 1.5 | 0.24 | 20 |
| Comp-tive Example 13 | IA | 12 | 228 | 3 | 0.24 | 1 |
| Comp-tive Example 14 | IA | 12 | 228 | 5 | 0.24 | 1 |
| Comp-tive Example 15 | SA | 14 | 223 | 4 | — | 0 |

Note: IA: Isophthalic acid, SA: Sebacic acid

TABLE 6

| | Layer A | | | | Layer B | | | | Layer C | | | |
|---|---|---|---|---|---|---|---|---|---|---|---|---|
| | Thickness μm | White pigment | Average diameter μm | Conc. of pigment wt. % | Thickness μm | White pigment | Average diameter μm | Conc. of pigment wt. % | Thickness μm | White pigment | Average diameter μm | Conc. of pigment wt. % |
| Comparative Example 16 | 3 | Rutile TiO2 | 0.24 | 1 | 13 | Calcium carbonate | 2.70 | 11 | 4 | Rutile TiO2 | 0.24 | 1 |
| Comparative Example 17 | 3 | Rutile TiO2 | 0.24 | 1 | 13 | Barium sulfate | 0.70 | 11 | 4 | Rutile TiO2 | 0.24 | 1 |

TABLE 7

| | Melt-extrusion temperature °C. | | | Longit-nal drawing conditions | | Lateral drawing conditions | | Heat-set temp. °C. |
|---|---|---|---|---|---|---|---|---|
| | Layer A | Layer B | Layer C | Temp. °C. | Draw ratio | Temp. °C. | Draw ratio | |
| Example 8 | 275 | 275 | 275 | 120 | 1.7 × 1.7 | 130 | 3.0 | 180 |
| Example 9 | 280 | 280 | 280 | 110 | 3.2 | 120 | 3.3 | 190 |
| Example 10 | 280 | 275 | 280 | 120 | 1.7 × 1.7 | 130 | 3.0 | 175 |
| Example 11 | 280 | 270 | 280 | 120 | 1.7 × 1.7 | 130 | 3.0 | 175 |
| Example 12 | 275 | 280 | 275 | 115 | 3.0 | 120 | 3.1 | 175 |
| Example 13 | 280 | 275 | 280 | 120 | 2.8 | 110 | 3.0 | 165 |
| Example 14 | 275 | 280 | 275 | 100 | 1.7 × 1.7 | 135 | 3.0 | 175 |
| Comparative Example 9 | 290 | 290 | 290 | 115 | 3.0 | 130 | 3.0 | 230 |
| Comparative Example 10 | 290 | 290 | 290 | 110 | 3.0 | 120 | 3.1 | 230 |
| Comparative Example 11 | 275 | 275 | 275 | 110 | 2.9 | 100 | 3.0 | 165 |
| Comparative Example 12 | 280 | 280 | 280 | 110 | 3.0 | 120 | 3.1 | 185 |
| Comparative Example 13 | 280 | 280 | 280 | 110 | 3.4 | 120 | 3.4 | 195 |
| Comparative Example 14 | 270 | 280 | 295 | 100 | 2.8 | 115 | 3.0 | 175 |
| Comparative Example 15 | 285 | 270 | 285 | 110 | 3.0 | 110 | 3.1 | 165 |
| Comparative Example 16 | 280 | 280 | 280 | 110 | 3.0 | 120 | 3.1 | 185 |
| Comparative Example 17 | 280 | 280 | 280 | 110 | 3.0 | 120 | 3.1 | 185 |

TABLE 8

| | X-ray diffraction intensity ratio | ρ/ρo | Intrinsic viscosity Layer A | Intrinsic viscosity Layer B | Intrinsic viscosity Layer C | Film-forming property | Lamina-n suitability | Abrasion Resistance Layer A | Abrasion Resistance Layer C | Deep-drawing suitability 1 | Deep-drawing suitability 2 | Impact crack resistance | Heat embrittlement resistance | Whiteness of outer face of can |
|---|---|---|---|---|---|---|---|---|---|---|---|---|---|---|
| Example 8 | 0.25 | 0.85 | 0.60 | 0.52 | 0.60 | ◯ | ◯ | ◯ | ◯ | ◯ | ◯ | ◯ | ◯ | ◯ |
| Example 9 | 0.27 | 0.99 | 0.56 | 0.55 | 0.56 | ◯ | ◯ | ◯ | ◯ | ◯ | ◯ | ◯ | ◯ | ◯ |
| Example 10 | 0.29 | 0.90 | 0.60 | 0.50 | 0.60 | ◯ | ◯ | ◯ | ◯ | ◯ | ◯ | ◯ | ◯ | ◯ |
| Example 11 | 0.26 | 0.76 | 0.58 | 0.48 | 0.58 | ◯ | ◯ | ◯ | ◯ | ◯ | ◯ | ◯ | ◯ | ◯ |
| Example 12 | 0.24 | 0.96 | 0.58 | 0.49 | 0.58 | ◯ | ◯ | ◯ | ◯ | ◯ | ◯ | ◯ | ◯ | ◯ |
| Example 13 | 0.26 | 0.78 | 0.60 | 0.48 | 0.60 | ◯ | ◯ | ◯ | ◯ | ◯ | ◯ | ◯ | ◯ | ◯ |
| Example 14 | 0.24 | 0.94 | 0.60 | 0.52 | 0.55 | ◯ | ◯ | ◯ | ◯ | ◯ | ◯ | ◯ | ◯ | ◯ |
| Comparative Example 9 | 0.18 | 0.71 | 0.58 | 0.53 | 0.58 | X | ◯ | ◯ | ◯ | X | — | — | — | ◯ |
| Comparative Example 10 | 0.22 | 0.95 | 0.59 | 0.53 | 0.59 | ◯ | ◯ | ◯ | ◯ | ◯ | ◯ | Δ | X | ◯ |
| Comparative Example 11 | 0.23 | 0.94 | 0.55 | 0.51 | 0.55 | ◯ | ◯ | ◯ | ◯ | ◯ | ◯ | ◯ | X | ◯ |
| Comparative Example 12 | 0.25 | 0.97 | 0.54 | 0.54 | 0.54 | ◯ | ◯ | X | X | ◯ | ◯ | ◯ | ◯ | ◯ |
| Comparative Example 13 | 0.23 | 1.00 | 0.62 | 0.58 | 0.62 | ◯ | ◯ | ◯ | ◯ | ◯ | ◯ | ◯ | ◯ | X |
| Comparative Example 14 | 0.24 | 0.77 | 0.66 | 0.51 | 0.50 | ◯ | X | ◯ | ◯ | ◯ | X | — | — | ◯ |
| Comparative Example 15 | 0.20 | 0.64 | 0.57 | 0.48 | 0.57 | X | ◯ | ◯ | ◯ | ◯ | X | — | — | ◯ |
| Comparative Example 16 | 0.24 | 0.83 | 0.63 | 0.52 | 0.63 | ◯ | ◯ | ◯ | ◯ | ◯ | X | — | — | X |
| Comparative Example 17 | 0.24 | 0.85 | 0.61 | 0.52 | 0.61 | ◯ | ◯ | ◯ | ◯ | ◯ | ◯ | ◯ | ◯ | X |

Examples 15 to 21 and Comparative Examples 18 to 24

Copolymerized polyethylene terephthalates copolymerized with the components shown in the Table 9 were incorporated with rutile titanium oxides having average particle diameters shown in the Table 9 in amounts shown in the Table 9 to obtain copolyesters for the layer A, layer B and layer C. These copolyesters were separately melted and then coextruded through adjacent dies, laminated and welded under the film-forming conditions shown in the Table 11 and the products were solidified by quenching to obtain undrawn films. The undrawn films were drawn in longitudinal direction and then lateral direction and subsequently heat-set to obtain biaxially oriented films having a thickness of 20 μm. The properties of these films are shown in the Table 12.

In the Examples 15, 17 and 18, the longitudinal drawing was carried out in two steps at a draw ratio of 1.7 each.

Comparative Example 25

A polyethylene terephthalate copolymer copolymerized with 12 mol % of isophthalic acid was incorporated with rutile titanium oxide and calcium carbonate having average particle diameters shown in the Table 10 in amounts shown in the Table 10, melted and extruded under the film-forming condition shown in the Table 11 and solidified by quenching to obtain an undrawn film. The undrawn film was drawn in longitudinal direction and then lateral direction and subsequently heat-set to obtain a biaxially oriented film having a thickness of 20 μm. The properties of the film are shown in the Table 12.

TABLE 9

| | Layer A | | | | | | Layer B | | | | |
|---|---|---|---|---|---|---|---|---|---|---|---|
| | Copolymerized Component | | Meltg Point | Thickness | Aver. Diam. | $TiO_2$ Conc. | Copolymerized Component | | Meltg Point | Thickness | Aver. Diam. | $TiO_2$ Conc. |
| | Comp. | Mol % | °C. | μm | μm | Wt. % | Comp | Mol % | °C. | μm | μm | Wt. % |
| Example 15 | IA | 12 | 228 | 2 | 0.22 | 2 | IA | 12 | 228 | 16 | 0.24 | 31 |
| Example 16 | IA | 12 | 228 | 3 | 0.24 | 10 | IA | 12 | 228 | 14 | 0.24 | 12 |
| Example 17 | IA | 12 | 228 | 2 | 0.24 | 2 | IA | 12 | 228 | 16 | 0.24 | 40 |
| Example 18 | IA | 15 | 221 | 4 | — | 0 | IA | 15 | 221 | 12 | 0.24 | 45 |
| Example 19 | SA | 6 | 244 | 1.5 | 0.20 | 7 | SA | 6 | 244 | 17 | 0.28 | 20 |
| Example 20 | IA | 14 | 223 | 4 | 0.20 | 1 | IA | 14 | 223 | 12 | 0.28 | 28 |
| Example 21 | IA | 14 | 223 | 3 | 0.22 | 1 | IA | 12 | 228 | 12 | 0.22 | 25 |
| Comp-tive Example 18 | — | | 260 | 2 | 0.27 | 5 | — | | 260 | 16 | 0.27 | 30 |
| Comp-tive Example 19 | IA | 4 | 250 | 3 | 0.22 | 4 | IA | 4 | 250 | 14 | 0.22 | 17 |
| Comp-tive Example 20 | IA | 22 | 208 | 3 | 0.22 | 5 | IA | 23 | 206 | 14 | 0.22 | 25 |

TABLE 9-continued

| | | | | | | | | | | | |
|---|---|---|---|---|---|---|---|---|---|---|---|
| Comp-tive Example 21 | SA | 10 | 233 | 2 | 0.22 | 20 | IA | 12 | 228 | 14 | 0.22 | 22 |
| Comp-tive Example 22 | IA | 12 | 228 | 3 | 0.22 | 1 | IA | 12 | 228 | 14 | 0.27 | 7 |
| Comp-tive Example 23 | IA | 12 | 228 | 3 | 0.22 | 2 | IA | 12 | 228 | 12 | 0.22 | 35 |
| Comp-tive Example 24 | SA | 14 | 223 | 4 | — | 0 | SA | 14 | 223 | 12 | 0.22 | 45 |

| | Layer C | | | | |
|---|---|---|---|---|---|
| | Copolymerized Component | | Meltg Point | Thickness | Aver. Diam. | TiO₂ Conc. |
| | Comp | Mol % | ° C. | μm | μm | Wt. % |
| Example 15 | IA | 12 | 228 | 2 | 0.22 | 2 |
| Example 16 | IA | 12 | 228 | 3 | 0.24 | 10 |
| Example 17 | IA | 12 | 228 | 2 | 0.24 | 2 |
| Example 18 | IA | 15 | 221 | 4 | — | 0 |
| Example 19 | SA | 6 | 244 | 1.5 | 0.20 | 7 |
| Example 20 | IA | 14 | 223 | 4 | 0.20 | 1 |
| Example 21 | SA | 10 | 233 | 5 | 0.22 | 7 |
| Comp-tive Example 18 | — | | 260 | 2 | 0.27 | 5 |
| Comp-tive Example 19 | IA | 4 | 250 | 3 | 0.22 | 4 |
| Comp-tive Example 20 | IA | 22 | 208 | 3 | 0.22 | 5 |
| Comp-tive Example 21 | SA | 10 | 233 | 3 | 0.22 | 20 |
| Comp-tive Example 22 | IA | 12 | 228 | 3 | 0.22 | 1 |
| Comp-tive Example 23 | IA | 12 | 228 | 5 | 0.22 | 2 |
| Comp-tive Example 24 | SA | 14 | 223 | 4 | — | 0 |

Note: IA: Isophthalic acid, SA: Sebacic acid

TABLE 10

| | Layer A | | | | Layer B | | | | Layer C | | | |
|---|---|---|---|---|---|---|---|---|---|---|---|---|
| | Thickness μm | White pigment | Average diameter μm | Conc. of pigment wt. % | Thickness μm | White pigment | Average diameter μm | Conc. of pigment wt. % | Thickness μm | White pigment | Average diameter μm | Conc. of pigment wt. % |
| Comparative Example 25 | 3 | Rutile TiO2 | 0.22 | 1 | 14 | Calcium carbonate | 2.90 | 11 | 3 | Rutile TiO2 | 0.22 | 1 |

TABLE 11

| | Melt-extrusion temperature ° C. | | | Longit-nal drawing conditions | | Lateral drawing conditions | | Heat-set |
|---|---|---|---|---|---|---|---|---|
| | Layer A | Layer B | Layer C | Temp. ° C. | Draw ratio | Temp. ° C. | Draw ratio | temp. ° C. |
| Example 15 | 275 | 275 | 275 | 110 | 1.7 × 1.7 | 130 | 3.0 | 180 |
| Example 16 | 280 | 280 | 280 | 110 | 3.2 | 120 | 3.3 | 190 |
| Example 17 | 280 | 275 | 280 | 120 | 1.7 × 1.7 | 130 | 3.0 | 175 |
| Example 18 | 280 | 270 | 280 | 115 | 1.7 × 1.7 | 130 | 3.0 | 175 |
| Example 19 | 275 | 280 | 275 | 115 | 3.0 | 120 | 3.1 | 175 |
| Example 20 | 280 | 275 | 280 | 120 | 3.0 | 120 | 3.0 | 185 |
| Example 21 | 275 | 280 | 275 | 100 | 2.9 | 135 | 3.0 | 175 |
| Comparative Example 18 | 290 | 295 | 290 | 115 | 3.0 | 130 | 3.0 | 230 |
| Comparative Example 19 | 290 | 290 | 290 | 110 | 3.0 | 120 | 3.1 | 230 |
| Comparative Example 20 | 275 | 275 | 275 | 110 | 2.9 | 100 | 3.0 | 165 |
| Comparative Example 21 | 280 | 280 | 280 | 110 | 3.0 | 120 | 3.1 | 185 |
| Comparative Example 22 | 280 | 280 | 280 | 120 | 3.3 | 120 | 3.4 | 195 |

TABLE 11-continued

| | Melt-extrusion temperature ° C. | | | Longit-nal drawing conditions | | Lateral drawing conditions | | Heat-set |
|---|---|---|---|---|---|---|---|---|
| | Layer A | Layer B | Layer C | Temp. ° C. | Draw ratio | Temp. ° C. | Draw ratio | temp. ° C. |
| Comparative Example 23 | 270 | 280 | 295 | 100 | 2.8 | 115 | 3.0 | 175 |
| Comparative Example 24 | 285 | 270 | 285 | 110 | 3.0 | 110 | 3.1 | 165 |
| Comparative Example 25 | 280 | 280 | 280 | 100 | 3.0 | 120 | 3.1 | 185 |

TABLE 12

| | X-ray diffraction intensity ratio | MOR value | ρ/ρo | Intrinsic viscosity | | | Film-forming property | Lamina-n suitability | Abrasion Resistance | | Deep-drawing suitability | | Impact crack resistance | Heat embrittle-ment resistance | Whiteness of outer face of can |
|---|---|---|---|---|---|---|---|---|---|---|---|---|---|---|---|
| | | | | Layer A | Layer B | Layer C | | | Layer A | Layer C | 1 | 2 | | | |
| Example 15 | 0.26 | 1.31 | 0.85 | 0.60 | 0.52 | 0.60 | ○ | ○ | ○ | ○ | ○ | ○ | ○ | ○ | ○ |
| Example 16 | 0.27 | 1.06 | 0.99 | 0.57 | 0.55 | 0.57 | ○ | ○ | ○ | ○ | ○ | ○ | ○ | ○ | ○ |
| Example 17 | 0.29 | 1.43 | 0.90 | 0.58 | 0.51 | 0.58 | ○ | ○ | ○ | ○ | ○ | ○ | ○ | ○ | ○ |
| Example 18 | 0.26 | 1.45 | 0.76 | 0.60 | 0.49 | 0.60 | ○ | ○ | ○ | ○ | ○ | ○ | ○ | ○ | ○ |
| Example 19 | 0.24 | 1.12 | 0.95 | 0.58 | 0.49 | 0.58 | ○ | ○ | ○ | ○ | ○ | ○ | ○ | ○ | ○ |
| Example 20 | 0.26 | 1.25 | 0.92 | 0.58 | 0.48 | 0.58 | ○ | ○ | ○ | ○ | ○ | ○ | ○ | ○ | ○ |
| Example 21 | 0.24 | 1.23 | 0.94 | 0.58 | 0.52 | 0.55 | ○ | ○ | ○ | ○ | ○ | ○ | ○ | ○ | ○ |
| Comparative Example 18 | 0.18 | 1.30 | 0.74 | 0.58 | 0.51 | 0.58 | X | ○ | ○ | ○ | X | — | — | — | ○ |
| Comparative Example 19 | 0.22 | 1.14 | 0.95 | 0.59 | 0.54 | 0.59 | ○ | ○ | ○ | ○ | ○ | ○ | Δ | X | ○ |
| Comparative Example 20 | 0.23 | 1.20 | 0.94 | 0.55 | 0.52 | 0.55 | ○ | ○ | ○ | ○ | ○ | ○ | ○ | X | ○ |
| Comparative Example 21 | 0.25 | 1.20 | 0.97 | 0.53 | 0.53 | 0.53 | ○ | ○ | X | X | ○ | ○ | ○ | ○ | ○ |
| Comparative Example 22 | 0.26 | 1.02 | 1.00 | 0.63 | 0.58 | 0.63 | ○ | ○ | ○ | ○ | ○ | ○ | ○ | ○ | X |
| Comparative Example 23 | 0.24 | 1.31 | 0.76 | 0.65 | 0.50 | 0.50 | ○ | X | ○ | ○ | ○ | X | — | — | ○ |
| Comparative Example 24 | 0.20 | 1.42 | 0.64 | 0.56 | 0.48 | 0.56 | X | ○ | ○ | ○ | ○ | X | — | — | ○ |
| Comparative Example 25 | 0.25 | 1.08 | 0.83 | 0.61 | 0.52 | 0.61 | ○ | ○ | ○ | ○ | ○ | X | — | — | X |

Examples 22 to 40 and Comparative Examples 26 to 36

Copolymerized polyethylene terephthalates copolymerized with the components shown in the Table 13 were incorporated with rutile titanium oxide and silicon dioxide particles having average particle diameters shown in the Table 13 in amounts shown in the Table 13, melted with separate extruders, coextruded through dies and solidified by quenching to obtain undrawn films. The undrawn films were drawn in longitudinal direction at 120° C. at a draw ratio of 3.0 and then in lateral direction at a draw ratio of 3.0 and subsequently heat-set at 180C to obtain biaxially oriented films composed of layers having thicknesses shown in the Table 13.

In the Example 39, a biaxially drawn film was manufactured by the same method except for the change of the longitudinal draw temperature to 105° C. and the longitudinal draw ratio to 3.3.

In the Comparative Example 36, a biaxially drawn film was manufactured by the same method except for the change of the longitudinal draw temperature to 118° C., the longitudinal draw ratio to 2.6 and the lateral draw ratio to 3.6. The properties of these films are shown in the Table 14.

TABLE 13-1

| | Layer A | | | | | | | | Layer B | | | | | |
|---|---|---|---|---|---|---|---|---|---|---|---|---|---|---|
| | Copolymer component | | | Thickness μm | Rutile TiO₂ | | SiO₂ | | Copolymer component | | | Thickness μm | Rutile TiO₂ | |
| | | | | | Aver dia μm | Content wt % | Aver dia μm | Content wt % | | | | | Aver dia μm | Content wt % |
| | Comp | mol % | m.p. ° C. | | | | | | Comp | mol % | m.p. ° C. | | | |
| Ex. 22 | IA | 12 | 228 | 1.5 | 0.22 | 3 | 1.6 | 0.06 | IA | 12 | 228 | 14 | 0.22 | 30 |
| Ex. 23 | IA | 14 | 223 | 1.5 | 0.22 | 3 | 1.6 | 0.06 | IA | 14 | 223 | 14 | 0.22 | 30 |

TABLE 13-1-continued

| | | | | | | | | | | | | | | |
|---|---|---|---|---|---|---|---|---|---|---|---|---|---|---|
| Ex. 24 | IA | 6 | 244 | 1.5 | 0.22 | 3 | 1.6 | 0.06 | IA | 6 | 244 | 14 | 0.22 | 30 |
| Ex. 25 | IA | 6 | 244 | 1.6 | 0.22 | 3 | 1.6 | 0.06 | IA | 12 | 228 | 14 | 0.22 | 30 |
| Ex. 26 | SA | 12 | 228 | 1.5 | 0.22 | 3 | 1.6 | 0.06 | SA | 12 | 228 | 14 | 0.22 | 30 |
| Ex. 27 | IA | 12 | 228 | 1.5 | 0.22 | 3 | 1.2 | 0.06 | IA | 12 | 228 | 14 | 0.22 | 30 |
| Ex. 28 | IA | 12 | 228 | 1.5 | 0.22 | 3 | 1.9 | 0.06 | IA | 12 | 228 | 14 | 0.22 | 30 |
| Ex. 29 | IA | 12 | 228 | 1.5 | 0.22 | 3 | 1.2 | 0.06 | IA | 12 | 228 | 14 | 0.22 | 30 |
| Ex. 30 | IA | 12 | 228 | 1.5 | 0.22 | 3 | 1.6 | 0.03 | IA | 12 | 228 | 14 | 0.22 | 30 |
| Ex. 31 | IA | 12 | 228 | 1.5 | 0.22 | 3 | 1.6 | 0.09 | IA | 12 | 228 | 14 | 0.22 | 30 |
| Ex. 32 | IA | 12 | 228 | 1.5 | 0.22 | 3 | 1.6 | 0.03 | IA | 12 | 228 | 14 | 0.22 | 30 |
| Ex. 33 | IA | 12 | 228 | 1.5 | 0.22 | 3 | 1.6 | 0.06 | IA | 12 | 228 | 14 | 0.22 | 20 |
| Ex. 34 | IA | 12 | 228 | 1.5 | 0.22 | 3 | 1.6 | 0.06 | IA | 12 | 228 | 14 | 0.22 | 45 |
| Ex. 35 | IA | 12 | 228 | 1.5 | 0.22 | 1 | 1.6 | 0.06 | IA | 12 | 228 | 14 | 0.22 | 30 |
| Ex. 36 | IA | 12 | 228 | 1.5 | 0.22 | 6 | 1.6 | 0.06 | IA | 12 | 228 | 14 | 0.22 | 30 |
| Ex. 37 | IA | 12 | 228 | 1.5 | 0.22 | 1 | 1.6 | 0.06 | IA | 12 | 228 | 14 | 0.22 | 30 |
| Ex. 38 | IA | 12 | 228 | 1.5 | 0.22 | 3 | 1.6 | 0.06 | IA | 12 | 228 | 14 | 0.22 | 30 |
| Ex. 39 | IA | 12 | 228 | 1.5 | 0.22 | 3 | 1.6 | 0.06 | IA | 12 | 228 | 14 | 0.22 | 30 |
| Ex. 40 | IA | 12 | 228 | 3.0 | 0.22 | 3 | 1.6 | 0.06 | IA | 12 | 228 | 12 | 0.22 | 30 |

| | Layer C | | | | | | |
|---|---|---|---|---|---|---|---|
| | Copolymer component | | | Thick- | Rutile TiO$_2$ | | SiO$_2$ | |
| | | | | | Aver | Con- | Aver | Con- |
| | Comp | mol % | m. p. ° C. | ness μm | dia μm | tent wt % | dia μm | tent wt % |
| Ex. 22 | IA | 12 | 228 | 1.6 | 0.22 | 3 | 1.6 | 0.06 |
| Ex. 23 | IA | 14 | 223 | 1.5 | 0.22 | 3 | 1.6 | 0.06 |
| Ex. 24 | IA | 6 | 228 | 1.5 | 0.22 | 3 | 1.6 | 0.06 |
| Ex. 25 | IA | 14 | 228 | 1.5 | 0.22 | 3 | 1.6 | 0.06 |
| Ex. 26 | SA | 12 | 228 | 1.5 | 0.22 | 3 | 1.6 | 0.06 |
| Ex. 27 | IA | 12 | 228 | 1.5 | 0.22 | 3 | 1.2 | 0.06 |
| Ex. 28 | IA | 12 | 228 | 1.5 | 0.22 | 3 | 1.9 | 0.06 |
| Ex. 29 | IA | 12 | 228 | 1.5 | 0.22 | 3 | 1.9 | 0.06 |
| Ex. 30 | IA | 12 | 228 | 1.5 | 0.22 | 3 | 1.6 | 0.03 |
| Ex. 31 | IA | 12 | 228 | 1.5 | 0.22 | 3 | 1.6 | 0.09 |
| Ex. 32 | IA | 12 | 228 | 1.5 | 0.22 | 3 | 1.6 | 0.09 |
| Ex. 33 | IA | 12 | 228 | 1.5 | 0.22 | 3 | 1.6 | 0.06 |
| Ex. 34 | IA | 12 | 228 | 1.5 | 0.22 | 3 | 1.6 | 0.06 |
| Ex. 35 | IA | 12 | 228 | 1.5 | 0.22 | 1 | 1.6 | 0.06 |
| Ex. 36 | IA | 12 | 228 | 1.5 | 0.22 | 6 | 1.6 | 0.06 |
| Ex. 37 | IA | 12 | 228 | 1.5 | 0.22 | 6 | 1.6 | 0.06 |
| Ex. 38 | IA | 12 | 228 | 1.5 | 0.22 | 3 | 1.6 | 0.06 |
| Ex. 39 | IA | 12 | 228 | 1.5 | 0.22 | 3 | 1.6 | 0.06 |
| Ex. 40 | IA | 12 | 228 | 3.0 | 0.22 | 3 | 1.6 | 0.06 |

Note: IA: Isophthalic acid, SA: Sebacic acid

TABLE 13-2

| | Layer A | | | | | | | | Layer B | | | | | |
|---|---|---|---|---|---|---|---|---|---|---|---|---|---|---|
| | Copolymer component | | | Thick- | Rutile TiO$_2$ | | SiO$_2$ | | Copolymer component | | | Thick- | Rutile TiO$_2$ | |
| | | | | | Aver | Con- | Aver | Con- | | | | | Aver | Con- |
| | Comp | mol % | m. p. ° C. | ness μm | dia μm | tent wt % | dia μm | tent wt % | Comp | mol % | m. p. ° C. | ness μm | dia μm | tent wt % |
| Comp. Ex. 26 | IA | 22 | 208 | 1.5 | 0.22 | 3 | 1.6 | 0.06 | IA | 22 | 208 | 14 | 0.22 | 30 |
| Comp. Ex. 27 | IA | 4 | 250 | 1.5 | 0.22 | 3 | 1.6 | 0.06 | IA | 4 | 250 | 14 | 0.22 | 30 |
| Comp. Ex. 28 | IA | 12 | 228 | 1.5 | 0.22 | 3 | 0.5 | 0.06 | IA | 12 | 228 | 14 | 0.22 | 30 |
| Comp. Ex. 29 | IA | 12 | 228 | 1.5 | 0.22 | 3 | 2.6 | 0.06 | IA | 12 | 228 | 14 | 0.22 | 30 |
| Comp. Ex. 30 | IA | 12 | 228 | 1.5 | 0.22 | 3 | 1.6 | 0.004 | IA | 12 | 228 | 14 | 0.22 | 30 |
| Comp. Ex. 31 | IA | 12 | 228 | 1.5 | 0.22 | 3 | 1.6 | 0.15 | IA | 12 | 228 | 14 | 0.22 | 30 |
| Comp. Ex. 32 | IA | 12 | 228 | 1.5 | 0.22 | 3 | 1.6 | 0.06 | IA | 12 | 228 | 14 | 0.22 | 10 |
| Comp. Ex. 33 | IA | 12 | 228 | 1.5 | 0.22 | 3 | 1.6 | 0.06 | IA | 12 | 228 | 14 | 0.22 | 60 |

TABLE 13-2-continued

| | Comp | mol % | m.p. °C | Thickness μm | Rutile TiO2 Aver dia μm | Content wt % | SiO2 Aver dia μm | Content wt % | Comp | mol % | m.p. °C | Thickness μm | Rutile TiO2 Aver dia μm | Content wt % |
|---|---|---|---|---|---|---|---|---|---|---|---|---|---|---|
| Comp. Ex. 34 | IA | 12 | 228 | 1.5 | 0.22 | 20 | 1.6 | 0.06 | IA | 12 | 228 | 14 | 0.22 | 30 |
| Comp. Ex. 35 | IA | 12 | 228 | 1.5 | 0.22 | 3 | 1.6 | 0.06 | IA | 12 | 228 | 14 | 0.22 | 30 |
| Comp. Ex. 36 | IA | 12 | 228 | 1.5 | 0.22 | 3 | 1.6 | 0.06 | IA | 12 | 228 | 14 | 0.22 | 30 |

| | Layer C Copolymer component Comp | mol % | m.p. °C | Thickness μm | Rutile TiO2 Aver dia μm | Content wt % | SiO2 Aver dia μm | Content wt % |
|---|---|---|---|---|---|---|---|---|
| Comp. Ex. 26 | IA | 22 | 208 | 1.5 | 0.22 | 3 | 1.6 | 0.06 |
| Comp. Ex. 27 | IA | 4 | 250 | 1.5 | 0.22 | 3 | 1.6 | 0.06 |
| Comp. Ex. 28 | IA | 12 | 228 | 1.5 | 0.22 | 3 | 0.5 | 0.06 |
| Comp. Ex. 29 | IA | 12 | 228 | 1.5 | 0.22 | 3 | 2.5 | 0.06 |
| Comp. Ex. 30 | IA | 12 | 228 | 1.5 | 0.22 | 3 | 1.6 | 0.004 |
| Comp. Ex. 31 | IA | 12 | 228 | 1.5 | 0.22 | 3 | 1.6 | 0.15 |
| Comp. Ex. 32 | IA | 12 | 228 | 1.5 | 0.22 | 3 | 1.6 | 0.06 |
| Comp. Ex. 33 | IA | 12 | 228 | 1.5 | 0.22 | 3 | 1.6 | 0.06 |
| Comp. Ex. 34 | IA | 12 | 228 | 1.5 | 0.22 | 20 | 1.6 | 0.06 |
| Comp. Ex. 35 | IA | 12 | 228 | 1.5 | 0.22 | 3 | 1.6 | 0.06 |
| Comp. Ex. 36 | IA | 12 | 228 | 1.5 | 0.22 | 3 | 1.6 | 0.06 |

Note: IA: Isophthalic acid, SA: Sebacic acid

TABLE 14-1

Film Properties

| | MOR value | Ra μm Layer A side | Ra μm Layer C side | SRz μm Layer A side | SRz μm Layer C side | Fric. Coeff. | Intrinsic viscosity Layer A | Layer B | Layer C | Film-forming property | Windability | Lamination suitability | Abrasion resistance Layer A side | Layer C side | Deep-drawing workability - 1 | Whiteness of outer face of can |
|---|---|---|---|---|---|---|---|---|---|---|---|---|---|---|---|---|
| Ex. 22 | 1.1 | 0.05 | 0.05 | 0.85 | 0.87 | 0.33 | 0.56 | 0.56 | 0.56 | ○ | ⊚ | ○ | ○ | ○ | ○ | ○ |
| Ex. 23 | 1.1 | 0.05 | 0.05 | 0.87 | 0.89 | 0.33 | 0.56 | 0.56 | 0.56 | ○ | ○ | ○ | ○ | ○ | ○ | ○ |
| Ex. 24 | 1.2 | 0.05 | 0.05 | 0.85 | 0.84 | 0.33 | 0.56 | 0.56 | 0.56 | ○ | ⊚ | ○ | ○ | ○ | ○ | ○ |
| Ex. 25 | 1.1 | 0.05 | 0.05 | 0.83 | 0.87 | 0.33 | 0.56 | 0.56 | 0.56 | ○ | ⊚ | ○ | ○ | ○ | ○ | ○ |
| Ex. 26 | 1.1 | 0.05 | 0.05 | 0.89 | 0.9 | 0.34 | 0.56 | 0.56 | 0.56 | ○ | ○ | ○ | ○ | ○ | ○ | ○ |
| Ex. 27 | 1.1 | 0.05 | 0.05 | 0.71 | 0.7 | 0.34 | 0.56 | 0.56 | 0.56 | ○ | ○ | ○ | ○ | ○ | ○ | ○ |
| Ex. 28 | 1.1 | 0.05 | 0.05 | 1.12 | 1.09 | 0.32 | 0.56 | 0.56 | 0.56 | ○ | ⊚ | ○ | ○ | ○ | ○ | ○ |
| Ex. 29 | 1.1 | 0.05 | 0.05 | 0.69 | 1.08 | 0.32 | 0.56 | 0.56 | 0.56 | ○ | ⊚ | ○ | ○ | ○ | ○ | ○ |
| Ex. 30 | 1.1 | 0.05 | 0.05 | 0.81 | 0.79 | 0.33 | 0.56 | 0.56 | 0.56 | ○ | ○ | ○ | ○ | ○ | ○ | ○ |
| Ex. 31 | 1.1 | 0.05 | 0.05 | 0.89 | 0.88 | 0.32 | 0.56 | 0.56 | 0.56 | ○ | ⊚ | ○ | ○ | ○ | ○ | ○ |
| Ex. 32 | 1.1 | 0.05 | 0.05 | 0.81 | 0.92 | 0.32 | 0.56 | 0.56 | 0.56 | ○ | ⊚ | ○ | ○ | ○ | ○ | ○ |
| Ex. 33 | 1.2 | 0.05 | 0.05 | 0.85 | 0.84 | 0.33 | 0.56 | 0.56 | 0.56 | ○ | ⊚ | ○ | ○ | ○ | ○ | ○ |
| Ex. 34 | 1.3 | 0.05 | 0.05 | 0.86 | 0.86 | 0.33 | 0.56 | 0.56 | 0.56 | ○ | ⊚ | ○ | ○ | ○ | ○ | ○ |
| Ex. 35 | 1.1 | 0.65 | 0.05 | 0.88 | 0.92 | 0.33 | 0.56 | 0.56 | 0.56 | ○ | ⊚ | ○ | ○ | ○ | ○ | ○ |
| Ex. 36 | 1.1 | 0.05 | 0.05 | 0.85 | 0.83 | 0.32 | 0.56 | 0.56 | 0.56 | ○ | ⊚ | ○ | ○ | ○ | ○ | ○ |
| Ex. 37 | 1.1 | 0.05 | 0.05 | 0.85 | 0.89 | 0.33 | 0.56 | 0.56 | 0.56 | ○ | ⊚ | ○ | ○ | ○ | ○ | ○ |
| Ex. 38 | 1.2 | 0.05 | 0.05 | 0.9 | 0.86 | 0.33 | 0.60 | 0.57 | 0.54 | ○ | ○ | ○ | ○ | ○ | ○ | ○ |
| Ex. 39 | 1.3 | 0.05 | 0.05 | 0.88 | 0.88 | 0.32 | 0.56 | 0.56 | 0.56 | ○ | ○ | ○ | ○ | ○ | ○ | ○ |
| Ex. 40 | 1.1 | 0.05 | 0.05 | 0.85 | 0.83 | 0.33 | 0.56 | 0.56 | 0.56 | ○ | ⊚ | ○ | ○ | ○ | ○ | ○ |

TABLE 14-2

| | | Ra μm | | SRz μm | | | Intrinsic viscosity | | | | | | Abrasion resistance | | | |
|---|---|---|---|---|---|---|---|---|---|---|---|---|---|---|---|---|
| | | Layer A side | Layer C side | Layer A side | Layer C side | | Layer A | Layer B | Layer C | | | | Layer A side | Layer C side | | |
| | MOR value | A side | C side | A side | C side | Fric. Coeff. | Layer A | Layer B | Layer C | Film-forming property | Wind-ability | Lamination suitability | Layer A side | Layer C side | Deep-drawing work-ability | Whiteness of outer face of can |
| Comp. Ex. 26 | 1.3 | 0.05 | 0.05 | 0.93 | 0.92 | 0.33 | 0.56 | 0.56 | 0.56 | X | ⊚ | ○ | ○ | ○ | ○ | ○ |
| Comp. Ex. 27 | 1.2 | 0.05 | 0.05 | 0.8 | 0.83 | 0.33 | 0.56 | 0.56 | 0.56 | X | ⊚ | X | ○ | ○ | X | ○ |
| Comp. Ex. 28 | 1.1 | 0.05 | 0.05 | 0.61 | 0.63 | 0.37 | 0.56 | 0.56 | 0.56 | ○ | X | X | ○ | ○ | ○ | ○ |
| Comp. Ex. 29 | 1.1 | 0.08 | 0.08 | 1.82 | 1.8 | 0.31 | 0.56 | 0.56 | 0.56 | ○ | ⊚ | ○ | ○ | ○ | X | ○ |
| Comp. Ex. 30 | 1.1 | 0.05 | 0.05 | 0.59 | 0.58 | 0.36 | 0.56 | 0.56 | 0.56 | ○ | X | X | ○ | ○ | ○ | ○ |
| Comp. Ex. 31 | 1.1 | 0.06 | 0.06 | 1.77 | 1.7 | 0.3 | 0.56 | 0.56 | 0.56 | ○ | ⊚ | ○ | ○ | ○ | X | ○ |
| Comp. Ex. 32 | 1.2 | 0.05 | 0.05 | 0.8 | 0.89 | 0.33 | 0.56 | 0.56 | 0.56 | ○ | ⊚ | ○ | ○ | ○ | ○ | X |
| Comp. Ex. 33 | 1.5 | 0.05 | 0.05 | 0.85 | 0.84 | 0.33 | 0.56 | 0.56 | 0.56 | X | ⊚ | ○ | ○ | ○ | ○ | ○ |
| Comp. Ex. 34 | 1.1 | 0.05 | 0.05 | 0.79 | 0.83 | 0.33 | 0.56 | 0.56 | 0.56 | ○ | ⊚ | ○ | X | X | ○ | ○ |
| Comp. Ex. 35 | 1.4 | 0.05 | 0.05 | 0.9 | 0.91 | 0.33 | 0.45 | 0.44 | 0.45 | X | ○ | ○ | ○ | ○ | X | ○ |
| Comp. Ex. 36 | 1.5 | 0.05 | 0.05 | 0.85 | 0.84 | 0.33 | 0.56 | 0.56 | 0.56 | X | ○ | ○ | ○ | ○ | X | ○ |

What is claimed is:

1. A white laminated polyester film for metallic plate lamination work comprising a layer A composed of a copolyester A, a layer B composed of a copolyester B, and a layer C composed of a copolyester C, wherein the layer A is laminated to one side of the layer B, the layer C is laminated to the other side of the layer B, and
   (i) copolyester A is a copolyester having a melting point of from 210 to 245° C. and an intrinsic viscosity of the polymer part of from 0.46 to 0.66 and containing 0 to 10% by weight of rutile titanium oxide having an average particle diameter of from 0.1 to 0.5 μm and 0.01 to 0.1% by weight of silicon dioxide particles having an average particle diameter of from 0.6 to 2.0 μm,
   (ii) copolyester B is a copolyester having a melting point of from 210 to 245° C. and an intrinsic viscosity of the polymer part of from 0.46 to 0.66 and containing 20 to 50% by weight of an inorganic particle consisting of rutile titanium oxide having an average particle diameter of from 0.1 to 0.5 μm, and
   (iii) copolyester C is a copolyester having a melting point of from 210 to 245° C. and an intrinsic viscosity of the polymer part of from 0.46 to 0.66 and containing 0 to 10% by weight of rutile titanium oxide having an average particle diameter of from 0.1 to 0.5 μm and 0.01 to 0.1% by weight of silicon dioxide particles having an average particle diameter of from 0.6 to 2.0 μm,
   wherein the concentration of rutile titanium oxide in copolyester A is lower than the concentration of rutile titanium oxide in copolyester B and the concentration of rutile titanium oxide in copolyester C is lower than the concentration of rutile titanium oxide in copolyester B.

2. A white laminated polyester film for metallic plate lamination work described in claim 1 wherein the film has an MOR value of 1.0 or more and 1.5 or less.

3. A white laminated polyester film for metallic plate lamination work described in claim 2 wherein the film has a MOR value of between 1.0 and 1.4.

4. A white laminated polyester film for metallic plated lamination work described in one of claims 1 to 3, wherein the center-line average height (Ra) of the film surface is from 0.03 to 0.08 μm, the 10-point average roughness (SRz) is from 0.7 to 1.5 μm and the friction coefficient is smaller than 0.35.

5. A white laminated polyester film for metallic plate lamination work described in one of the claims 1 to 3, wherein the silicon dioxide particles in copolyester A and copolyester C are silicon dioxide particles having a true spherical form.

6. A white laminated polyester film for metallic plate lamination work described in one of claims 1 to 3, wherein the composition of the particles in copolyester C is the same as that of copolyester A.

7. A white laminated polyester film for metallic plate, lamination work described in one of claims 1 to 3, characterized in that the (100) plane and the (1̄10) plane parallel to the film surface satisfy the following relationship:

$$0.15 \leq f(1\bar{1}0)/f(100) \leq 0.40$$

wherein $f(1\bar{1}0)$ is X-ray diffraction intensity attributed to the $(1\bar{1}0)$ plane and $f(100)$ is X-ray diffraction intensity attributed to the (100) plane.

8. A white laminated polyester film for metallic plate lamination work described in claim 1 wherein the ratio of the apparent density ($\rho$) to the calculated density ($\rho_0$) of the entire laminated film ($\rho/\rho_0$) satisfies the following formula:

$$0.75 \leq \rho/\rho_0 \leq 1.00$$

wherein $$\rho_0 = 100\rho_t\rho_s \frac{\sum_{i=1}^{n}\left(\frac{X_i\rho_i}{W_i\rho_s(\rho_i-\rho_t)+Z_i\rho_t(\rho_i-\rho_s)+100\rho_t\rho_s}\right)}{\sum_{i=1}^{n} X_i}$$

in the above formula,
- $\rho$: apparent density (g/cm$^3$) of the entire laminated film:
- $\rho_0$: calculated density (g/cm$^3$) of the entire laminated film:
- $\rho_i$: density (g/cm$^3$) of the polymer part of each copolyester:
- $\rho_t$: density (g/Cm$^3$) of rutile titanium oxide:
- $\rho_s$: density (g/cm$^3$) of silicon dioxide particle
- $X_i$: thickness ($\mu$m) of each layer:
- $W_i$: concentration (wt. %) of rutile titanium oxide in each copolyester:
- $Z_i$: concentration (wt. %) of silicon dioxide particle in each copolyester:
- n: number of copolyester layers.

9. A white laminated polyester film for metallic plate lamination work described in claim 8 wherein the ratio of the apparent density ($\rho$) to the calculated density ($\rho_0$) of the entire laminated film ($\rho/\rho_0$) falls within the range of from 0.90 to 1.00.

10. A white laminated polyester film for metallic plate lamination work described in claim 1 wherein the film thickness is in the range of from 6 to 75 $\mu$m.

11. A white laminated polyester film for metallic plate lamination work described in claim 1 wherein the ratio of the thickness of layer A ($T_A$) to that of layer B ($T_B$) ($T_A/T_B$) is in the range of from 0.05 to 1 and the ratio of the thickness of layer C ($T_C$) to that of layer B ($T_B$) ($T_C/T_B$) is in the range of from 0.05 to 1.

12. A white laminated polyester film for metallic plate. lamination work described in claim 1 wherein a can produced by the deep-drawing of a metallic plate laminated with the polyester film gives an electric current of 0.2 mA or less in the EVR test of the can.

* * * * *